US009304229B2

(12) United States Patent
Shannon et al.

(10) Patent No.: US 9,304,229 B2
(45) Date of Patent: Apr. 5, 2016

(54) RECORDING BAROMETER HOROLOGICAL COMPLICATION

(71) Applicant: SBE Horological Automata, LLC, Marblehead, MA (US)

(72) Inventors: Robert Allen Shannon, Leominster, MA (US); Naomi Shulamith Diesendruck, Leominster, MA (US)

(73) Assignee: SBE Horological Automata, LLC, Marblehead, MA (US)

( * ) Notice: Subject to any disclaimer, the term of this patent is extended or adjusted under 35 U.S.C. 154(b) by 70 days.

(21) Appl. No.: 14/048,761

(22) Filed: Oct. 8, 2013

(65) Prior Publication Data

US 2014/0260606 A1    Sep. 18, 2014

Related U.S. Application Data

(60) Provisional application No. 61/782,123, filed on Mar. 14, 2013.

(51) Int. Cl.
*G01L 7/20*    (2006.01)
*G01W 1/02*    (2006.01)
*G01L 19/10*    (2006.01)

(52) U.S. Cl.
CPC . *G01W 1/02* (2013.01); *G01L 19/10* (2013.01)

(58) Field of Classification Search
CPC ........... G01L 19/10; G01L 19/00; G01L 7/00; G01L 19/08; G01L 7/12; G01L 19/083; G01W 1/02; G01W 1/04; B63C 11/32; B63C 2011/021
USPC .................................... 73/1.71, 384; 702/138
See application file for complete search history.

(56) References Cited

U.S. PATENT DOCUMENTS

| 6,519,548 | B1  |    | 2/2003 | Kuroda   |          |
|-----------|-----|----|--------|----------|----------|
| 2006/0212257 | A1 |    | 9/2006 | Makela   |          |
| 2008/0202234 | A1 |    | 8/2008 | O'Neill  |          |
| 2010/0170337 | A1 |    | 7/2010 | Ahlstrom |          |
| 2013/0235706 | A1 | *  | 9/2013 | Takenawa | G04C 3/143 |
|           |     |    |        |          | 368/222  |

FOREIGN PATENT DOCUMENTS

EP    1141788 B1    3/2009

\* cited by examiner

*Primary Examiner* — Lisa Caputo
*Assistant Examiner* — Brandi N Hopkins
(74) *Attorney, Agent, or Firm* — Robert Plotkin, P.C.; Robert Plotkin (57) ABSTRACT

An improved system for the recording and display of barometric pressure information, comprising a timekeeper, barometric sensor, memory system, and display, integrated to form an instrument or horological complication for the display of the current barometric pressure and past pressure history by use of an animated display.

27 Claims, 9 Drawing Sheets

RECORDING BAROMETER HOROLOGICAL COMPLICATION

BACKGROUND

Barometric instruments commonly provide a method of tracking the current barometric pressure as well as previous barometric pressure values, and changes in barometric pressure over time. This information has proven useful in understanding and predicting changes in the weather.

Barometers commonly provide a manually adjustable index that is set to the current barometric reading to be used as a reference for later readings in order to track changes in barometric pressure over time. This index must be manually set to the current barometric value, and the time noted for later reference. At the next observation it is necessary to manually calculate the pressure change between observations, and reset the index, and record the time of observation in order to repeat the process.

Barographs automatically produce a graph of barometric pressure over time, providing a better understanding of barometric trends without the need to manually set an index and record values. Barometric values and trends are indicated by the position and shape of the graph against background scales for pressure and time. Barograph displays were traditionally printed on paper rolls or charts, while modern barograph displays are commonly electronic.

Barometers and barometric compensation mechanisms have long been associated with precision timekeepers, but the barograph display is not well suited for traditional (analog) clock and watch dials.

SUMMARY

Certain embodiments of the present invention include an instrument or horological complication for use in connection with a timekeeper and barometric instrument to measure barometric data and to provide an animated display of such data. This animated display may be implemented, for example, by using moving mechanical parts, graphical representations of moving mechanical parts, graphical representations displayed on a visual output device, such as a computer monitor or other display screen (e.g., a touch screen), or any combination thereof.

Certain embodiments of the present invention include a system and method for the display of barometric pressure and trend data that may be implemented, for example, by a mechanical design, electromechanical design, or a fully electronic design (such as a computing device which implements embodiments of the present invention using a computer processor and a memory, wherein the memory stores a computer program for causing the computer processor to perform the functions disclosed herein).

Certain embodiments of the present invention include a system and method to integrate a timekeeper and barometric instrument such that the barometric value and trend data may be explicitly synchronized to the time indicated by the timekeeper.

Certain embodiments of the present invention include a system and method for the display of barometric pressure and trend data that is easily read and understood.

Certain embodiments of the present invention include a system and method to display barometric pressure and trend data either automatically, in response to user input (e.g., a manual command), or a combination thereof.

Certain embodiments of the present invention include a system and method to display barometric pressure and trend data, where the pressure history may be displayed using absolute values and/or values relative to the current barometric pressure.

Certain embodiments of the present invention include a system and method for the display of sufficient information on barometric pressure trends such that knowledgeable persons would be able to recognize the implications of the displayed information on developing weather trends.

Certain embodiments of the present invention include a system and method to display barometric data that is well suited for modern or traditional analog clock and watch dials and/or modern electronic displays.

Certain embodiments of the present invention include a system and method of displaying barometric pressure and trend data in a simple and effective way that has high visual impact and interest.

Certain embodiments of the present invention include a system and method that displays barometric pressure and trend data using the familiar concepts of relative angles, positions, and motions of indicators that are used in reading conventional analog clocks and watches.

Certain embodiments of the present invention include a system and method for the display of barometric pressure and trend data that may supplement an existing timekeeping indicator to also serve as a pressure history offset indicator, thereby allowing embodiments of the present invention to be implemented by the addition of barometric pressure and pressure history indicators to an existing timekeeper.

Certain embodiments of the present invention include a system and method for the display of barometric pressure and trend data that may also include an altimeter for measuring a current altitude and for compensating (e.g., modifying) the barometric pressure readings based on the current altitude, such as based on any changes in the current altitude relative to a previous altitude measured by the altimeter, such as may be experienced by a moving or portable instrument, and thereby providing output representing the results of compensating the barometric pressure readings based on changes in altitude.

One advantage of embodiments of the present invention is that they may be used to provide an improved awareness of changes in barometric pressure, to provide the ability to observe patterns of change, and to learn how they relate to evolving weather patterns.

One embodiment of the present invention comprises a timekeeper with a traditional analog display having a seconds dial with an additional scale or chapter ring added, as well as current pressure and pressure history indicators and their associated barometric scales. The scale or chapter ring added to the seconds hand serves as the pressure history offset indicator. This scale or chapter ring is divided into segments, wherein each segment is marked with a pressure history offset value. As an example, a chapter ring having a plurality of segments (e.g., six segments) may be added inside the conventional sixty second track. A first segment (e.g., the segment from zero to ten seconds) may be marked with a first offset value (e.g., an offset value of minus 24 hours). A second segment (e.g., the segment from ten to twenty seconds) may be marked with a second offset value (e.g., an offset value of minus 20 hours). A third segment (e.g., the segment from twenty to thirty seconds) may be marked with a third offset value (e.g., an offset value of minus 16 hours). A fourth segment (e.g., the segment from thirty seconds to forty seconds) may be marked with a fourth offset value (e.g., an offset value of minus 12 hours). A fifth segment (e.g., the segment from forty to fifty seconds) may be marked with a fifth offset value (e.g., an offset value of minus 8 hours). A sixth segment (e.g., the segment from fifty to zero (or sixty) seconds) may be marked with a sixth offset value (e.g., an offset value of minus 4 hours). In this embodiment, as the seconds hand moves from one pressure history offset segment to another, the pressure history indicator displays the recorded barometric pressure value from the memory system selected by the pressure history offset value corresponding to the pressure history offset segment currently underneath the seconds hand. In this example, the pressure history indicator displays 24 hours of pressure history once each minute. This animation sequence includes a number of movements of the pressure history indicator equal to the number of segments.

Another embodiment of the present invention comprises the same features as the first embodiment applied to a traditional Astronomical Regulator dial (having separate centers of rotation for the hours, minutes, and seconds hands), and uses an electromechanical display.

Another embodiment of the present invention comprises the same features as the first embodiment applied to a conventional analog clock or watch dial having a center or 'sweep seconds' dial. This embodiment more easily allows the pressure history offset track or chapter ring to be divided into a larger number of segments for a more complex and detailed pattern of motion of the pressure history indicator.

Another embodiment of the present invention comprises a timekeeper using a digital display and a separate display for the current pressure history offset. The pressure history offset value may be displayed as a numeric value, a series of separate indicators, or an analog display (as shown).

Another embodiment of the present invention comprises a timekeeper using any type of display, one current pressure indicator, and several pressure history indicators. Each pressure history indicator may be associated with a pressure history offset value, and each indicator may be unique and distinguishable from the others by some feature such as length, shape, color, or any combination thereof. Each of these pressure history indicators may register its respective value and all indicators may be animated as the barometric pressure evolves over time.

Another embodiment of the invention comprises the same features as the first embodiment where the pressure history indicator scale has been calibrated in units relative to the current pressure value.

One embodiment of the invention is directed to a device comprising: a timekeeper comprising means for producing output representing a plurality of times; a barometric sensor comprising means for outputting a plurality of barometric pressure values, wherein each of the plurality of barometric pressure values is associated with a distinct one of the plurality of times; a memory system comprising representations of the plurality of times and representations of the plurality of barometric pressure values; and a display system comprising history output means for outputting, based on the representations of the plurality of times and the representations of the plurality of barometric pressure values in the memory system, visual representations of the plurality of barometric pressure values and the plurality of times associated with the plurality of barometric pressure values.

Another embodiment of the invention is directed to a method comprising: (a) identifying a first current time; identifying a first previous time based on the first current time; retrieving, from a memory, a first stored barometric pressure reading associated with the first previous time; and displaying a representation of the first stored barometric pressure reading.

Other features and advantages of various aspects and embodiments of the present invention will become apparent from the following description and from the claims.

DETAILED DESCRIPTION

Barometers and barometric compensation mechanisms have long been associated with precision timekeepers, but the barograph display is not well suited for traditional (analog) clock and watch dials. Embodiments of the present invention include an instrument and method for the measurement and display of barometric pressure and trend data using, for example, the relative position and angles of indicators in much the same manner as an analog clock face displays time.

The resulting display communicates the current value and past evolution of barometric pressure in a simple, intuitive, and novel manner well suited for use in fine timekeepers and meteorological instruments.

Certain embodiments of the present invention include a recording barometer horological complication which includes a timekeeper, a barometric sensor, a memory system, and a display system, integrated to form an instrument for the animated display of the current barometric pressure and past pressure history.

In general, the timekeeper outputs, at any particular time, an output representing that time. The time represented by the output of the timekeeper at any particular time is referred to herein as the "current time." As time passes, the output of the timekeeper may change to reflect the changing current time. Therefore, over time the timekeeper may produce outputs representing a plurality of current times. Once a particular time has passed, that time is no longer a "current" time. Any reference herein to "current" times that are in the past should be understood to refer to times which were current at the time at which they were sensed, even though they no longer are current. To avoid confusion, current times that are in the past may be referred to herein merely as "times."

In general, the barometric sensor produces, at any particular time, an output representing a barometric pressure value sensed by the barometric sensor at or around that current time. The barometric pressure value represented by the barometric sensor at any particular current time is referred to herein as the "current barometric pressure value" or the "current barometric pressure." Therefore, over time the barometric pressure sensor may product output representing a plurality of current barometric pressure values, each of which may be associated with a corresponding current time. For example, if the barometric sensor outputs a first barometric pressure value at 10:00 AM on Jun. 1, 2013, then that first barometric pressure value is said to be "associated" with the time of 10:00 AM on Jun. 1, 2013. Similarly, if the barometric sensor outputs a second barometric pressure value (which may be the same as or differ from the first barometric pressure value) at 10:01 AM on Jun. 1, 2013, then that second barometric pressure value is said to be "associated" with the time of 10:01 AM on Jun. 1, 2013. Any reference herein to "current" barometric pressure values that are associated with times in the past should be understood to refer to barometric pressure values which were current at the time at which they were sensed, even though they no longer are current. To avoid confusion, current barometric pressure values that are in the past may be referred to herein merely as "barometric pressure values."

In general, the memory system may contain data or other representations of any number of current times, any number of current barometric pressure values, and associations between current times and corresponding current barometric pressure values. Each one of the current barometric pressure values may be associated with a distinct one of the current times. For example, consider a case in which the barometric sensor produces an output representing a first barometric pressure value sensed by the barometric sensor at or around a first current time, and in which the timekeeper produces an output representing that first current time at or around the first current time. Embodiments of the present invention may store, in the memory system, data representing the first barometric pressure value, data representing the first current time, and data representing an association between the first barometric pressure value and the first current time. Similarly, if the barometric sensor produces an output representing a second barometric pressure value (which may be the same as or differ from the first barometric pressure value) sensed by the barometric sensor at or around a second current time, and the timekeeper produces an output representing that second current time at or around the second current time, then embodiments of the present invention may store, in the memory system, data representing the second barometric pressure value, data representing the second current time, and data representing an association between the second barometric pressure value and the second current time. The memory system may or may not explicitly store data representing the associations between barometric pressure values and corresponding times; such associations may, for example, be implicit in the form in which the barometric pressure values and corresponding forms are stored in the memory system.

In general, the display system includes means for outputting visual representations of the barometric pressure values and associated times stored in the memory system. The display system may generate such visual representations based on the representations of the plurality of barometric pressure values and the plurality of times stored in the memory system. Particular examples of such visual representations will be described below and are illustrated in the various figures appended hereto. As such examples illustrate, the visual representation of any particular barometric pressure value may provide a visual indication of the time that is associated with that barometric pressure value. As such examples further illustrate, the visual representation of a particular barometric pressure value and its associated time may include a visual representation of the particular barometric pressure value and a distinct visual representation of the associated time.

Figure 1:
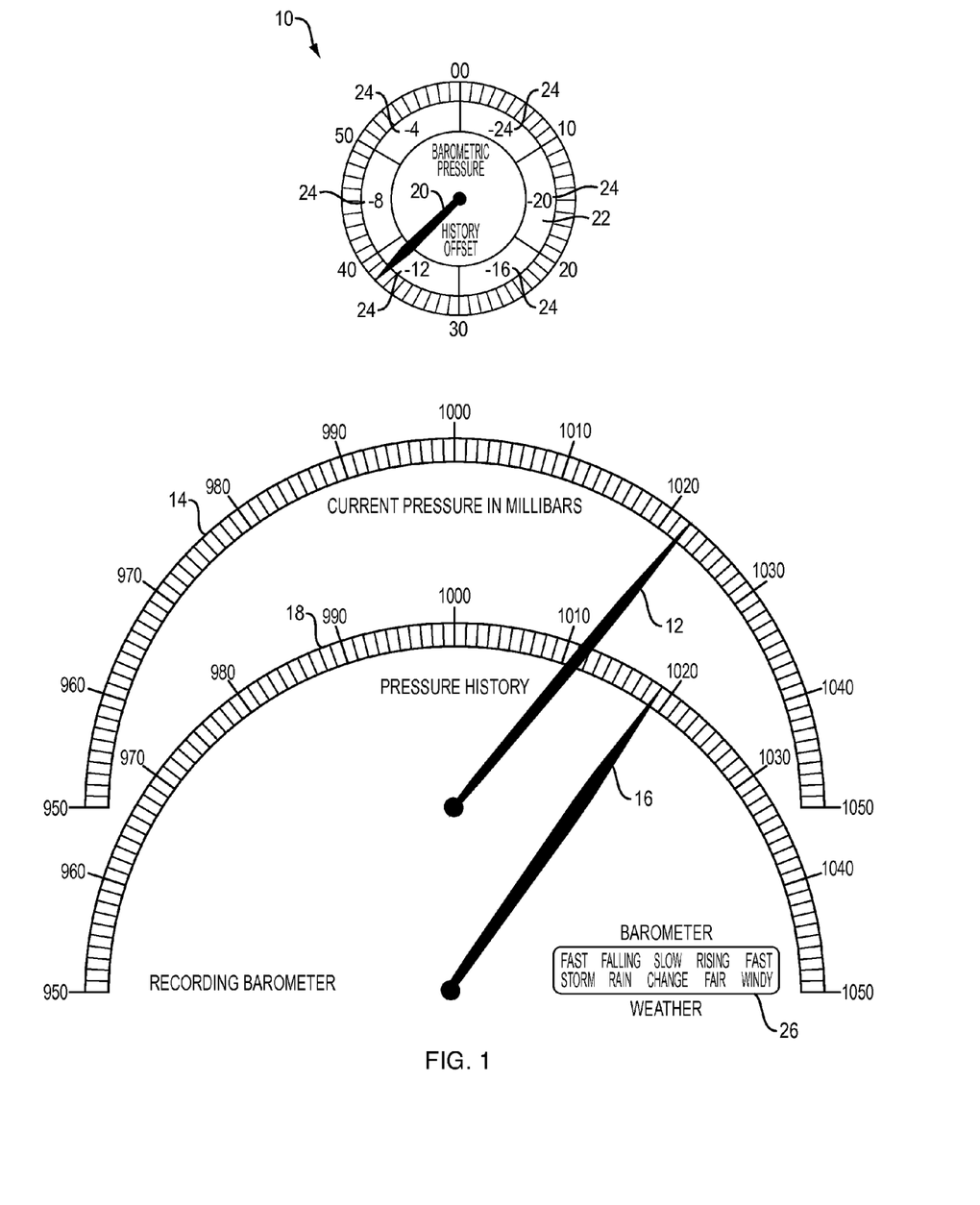
FIG. 1 shows a current pressure indicator, a pressure history indicator, the scales thereof, and the pressure history offset scale added to the seconds register of the timekeeper, according to one embodiment of the present invention. The remainder of the timekeeper is not shown for clarity.

One system 10 implemented according to an embodiment of the present invention is shown in FIG. 1. System 10 comprises a current barometric pressure indicator 12 (which provides visual output representing a current output of the barometric sensor), a current barometric pressure scale 14, a pressure history indicator 16, a pressure history scale 18, a pressure history offset indicator 20, and a pressure history offset scale 22.

In the system 10 of FIG. 1, the pressure history offset indicator 20 is also the seconds hand of the timekeeper (not shown in FIG. 1). The timekeeper may be any clock (such as a conventional analog or digital clock), watch, hardware clock, software clock, or other device or mechanism for keeping time. More generally, the pressure history offset indicator 20 may be the same component as the component of a timekeeper which serves as a seconds indicator (such as the final two digits of the digital display shown in FIG. 4). Similarly, any reference herein to a "seconds hand" in connection with any embodiment of the present invention is equally applicable to any component of a timekeeper which serves as a seconds indicator (i.e., an indication of the seconds component of the current time). In the embodiment of FIG. 1, as the seconds hand 20 moves through each of six pressure history offset segments of the pressure history scale 22, the pressure history indicator 16 displays the barometric pressure value recorded in a barometric pressure memory system, as selected (e.g., indexed or otherwise addressed) by the pressure history offset value 24. In the embodiment of FIG. 1, the pressure history indicator 16 automatically displays the past 24 hours of pressure history each minute.

The system 10 of FIG. 1 also includes a simple guide 26 to interpreting pressure changes over time and their relationship to changing weather.

Figure 2:
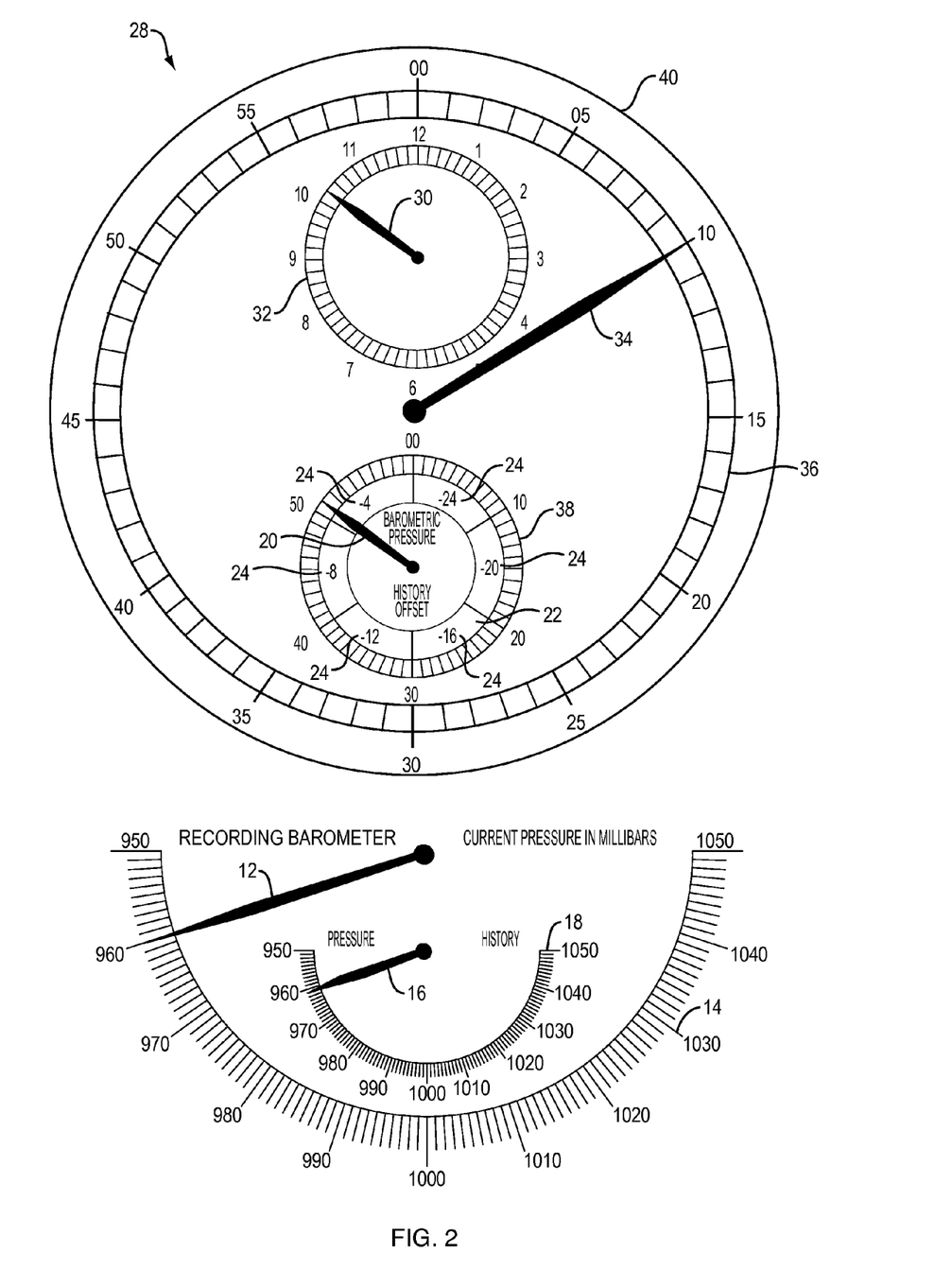
FIG. 2 shows another embodiment of the present invention applied to a timekeeper using an astronomical regulator dial.

Another system 28 implemented according to an embodiment of the present invention is shown in FIG. 2. System 28 comprises a current barometric pressure indicator 12, a current barometric pressure scale 14, a pressure history indicator 16, a pressure history scale 18, a pressure history offset indicator 20, a pressure history offset scale 22, an hour hand 30, an hours register 32, a minutes hand 34, a minutes register 36, and a seconds register 38.

FIG. 2 shows the system 28 applied to an astronomical regulator dial 40, where the seconds hand 20 acts as the pressure history offset indicator while performing its normal timekeeping function, so that the pressure history indicator 16 automatically displays the past 24 hours of pressure history each minute.

Figure 3:
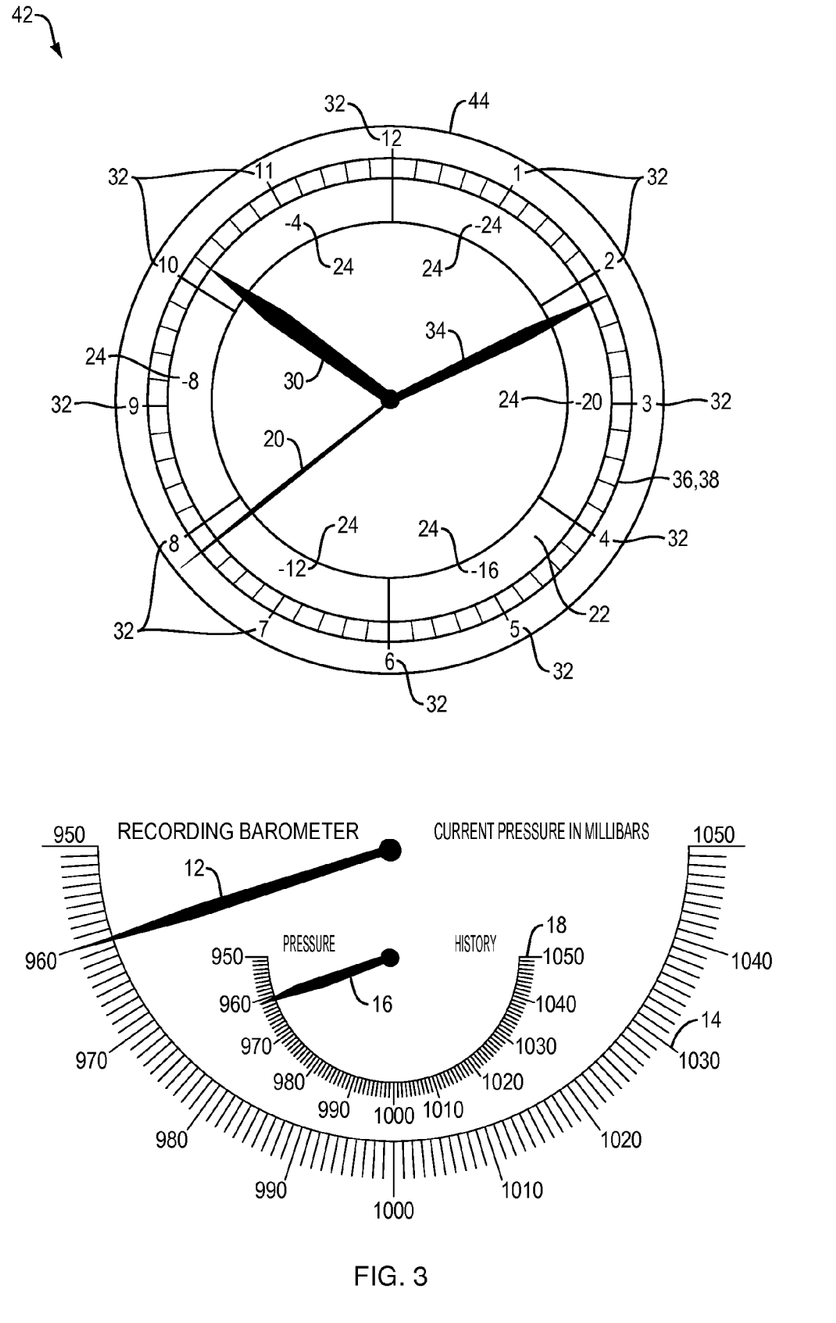
FIG. 3 shows another embodiment of the present invention applied to a timekeeper using a conventional analog dial with a sweep seconds hand.

Another system 42 implemented according to an embodiment of the present invention is shown in FIG. 3. System 42 comprises a current barometric pressure indicator 12, a current barometric pressure scale 14, a pressure history indicator 16, a pressure history scale 18, a pressure history offset indicator 20, a pressure history offset scale 22, an hours hand 30, an hours register 32, a minutes hand 34, and a minutes register 36.

FIG. 3 shows the system 42 applied to a conventional analog clock dial 44 with a sweep seconds hand 20. As in the embodiment of FIG. 2, the pressure history offset indicator 20 of the system 42 in FIG. 3 also serves as the seconds hand for the timekeeper, so that pressure history indicator 16 automatically displays the past 24 hours of pressure history each minute.

Figure 4:
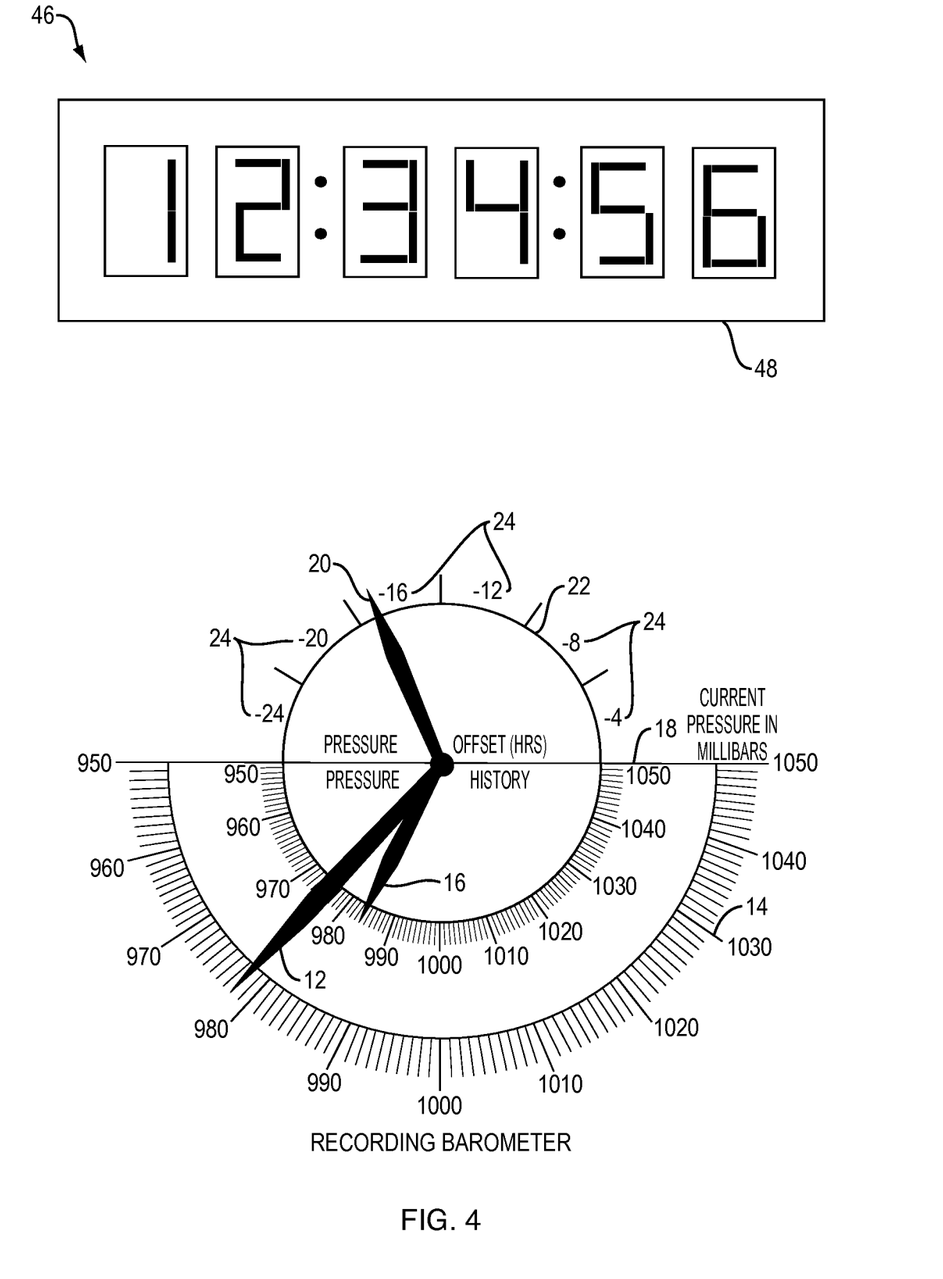
FIG. 4 shows another embodiment of the present invention applied to a timekeeper using a digital time display and analog pressure, pressure history, and history offset indicators.

Another system 46 implemented according to an embodiment of the present invention is shown in FIG. 4. System 46 comprises current a barometric pressure indicator 12, a current barometric pressure scale 14, a pressure history indicator 16, a pressure history scale 18, a pressure history offset indicator 20, a pressure history offset scale 22, and a digital time display 48.

FIG. 4 shows the system 46 applied to a clock using a digital time display 48. FIG. 4 also shows the pressure history offset indicator 20 as being a separate element from the time display 48. The pressure history offset indicator 20 in FIG. 4 may operate automatically in synchronization with the time display 48, or in response to a manual command (input received from a user of the system 46). Although the pressure history offset indicator 20 provides a useful visual indication of the current history offset, the indicator 20 may be omitted from the system of FIG. 4, in which case the seconds portion of the time display 48 may still provide a visual indication of the current history offset.

Figure 5:
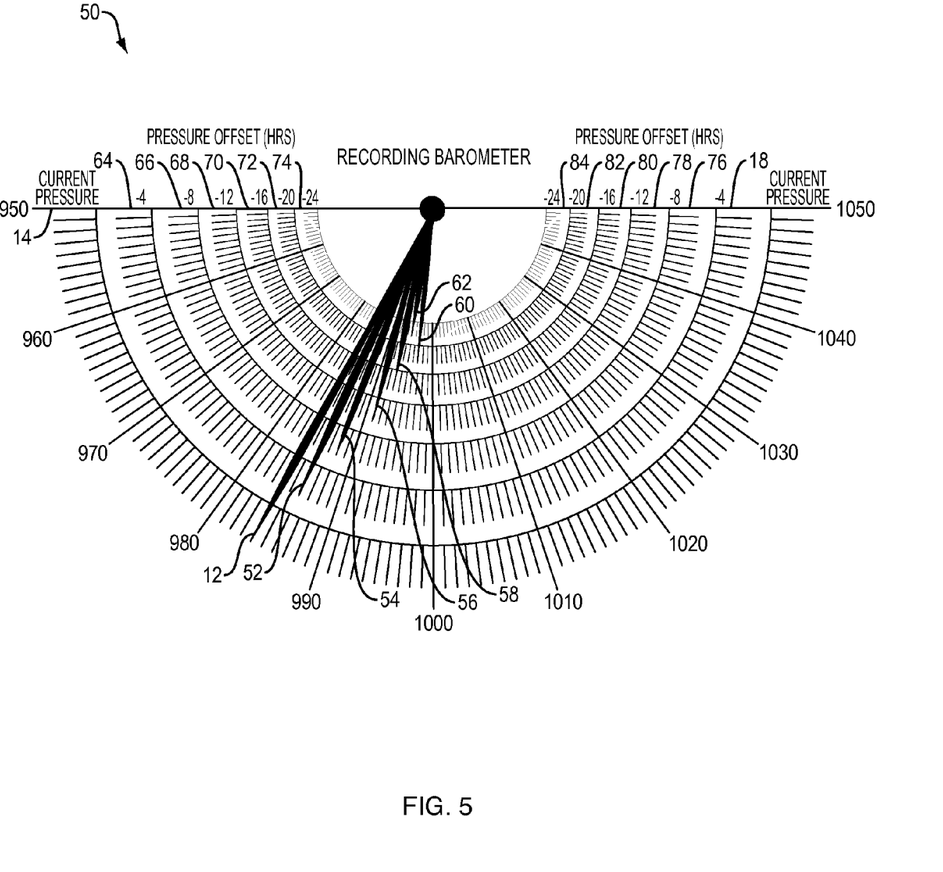
FIG. 5 shows another embodiment of the present invention that may be applied to any form of timekeeper using multiple pressure history indicators in place of a single pressure history indicator and a history offset indicator.

Another system 50 implemented according to an embodiment of the present invention is shown in FIG. 5. System 50 comprises a current pressure indicator 12, a current barometric pressure scale 14, a number of past pressure indicators (52, 54, 56, 58, 60, and 62), a number of pressure history offset values (64, 66, 68, 70, 72, and 74), and a number of pressure history scales (18, 76, 78, 80, 82, and 84).

FIG. 5 shows an embodiment in which each of a plurality of pressure history indicators (52, 54, 56, 58, 60, and 62) is associated with a corresponding one of a plurality of pressure history offset values (64, 66, 68, 70, 72, and 74). In this embodiment, the current pressure scale 14 and the pressure history scales (18, 76, 78, 80, 82, and 84) may be combined into an extended common scale for all indicators. This embodiment also makes a pressure history offset value indicator optional, with the pressure history shown by a plurality of indicators (52, 54, 56, 58, 60, and 62). Each of the plurality of pressure history indicators (52, 54, 56, 58, 60, and 62) is unique and distinguishable from the others by some feature such as length, shape, color, or some combination thereof.

With the inclusion of a pressure history offset indicator (not shown) this embodiment of the present invention may display the pressure history over one time span (in this embodiment 24 hours) as its normal operating mode, and then display the pressure history over longer periods of time automatically or in response to a manual command (e.g., input received from a user of the system 50).

Figure 6:
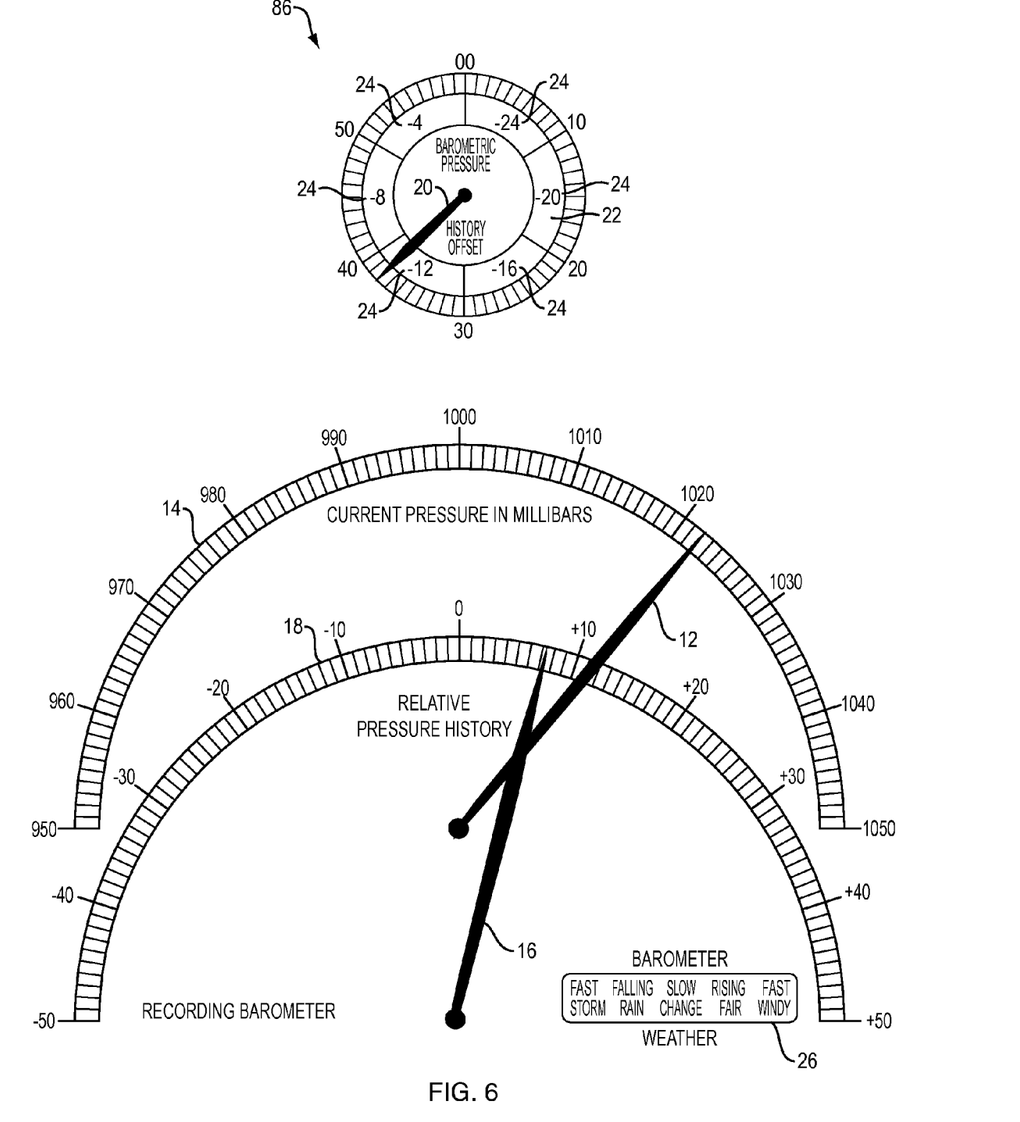
FIG. 6 shows another embodiment of the present invention where the current pressure scale is calibrated in absolute units and the pressure history scale is calibrated in units relative to the current pressure.

Another system 86 implemented according to an embodiment of the present invention is shown in FIG. 6. System 86 comprises a current pressure indicator 12, a current barometric pressure scale 14, a pressure history indicator 16, a pressure history scale 18, a pressure history offset indicator 20, and a pressure history offset scale 22.

The pressure history offset indicator 20 may be an existing component of the timekeeper, or a dedicated indicator. Furthermore, the system 86 includes a guide 26 to interpreting pressure changes over time and their relationship to changing weather.

In the system 86, the current pressure scale 14 is calibrated in absolute units while the pressure history scale 18 is calibrated in units relative to the current pressure. With the pressure history calibration shown, rising or falling barometric pressure is indicated by the angle between the pressure history indicator 16 and an imaginary vertical line, rather than the angle between the pressure history indicator 16 and the current pressure indicator 12.

Figure 7:
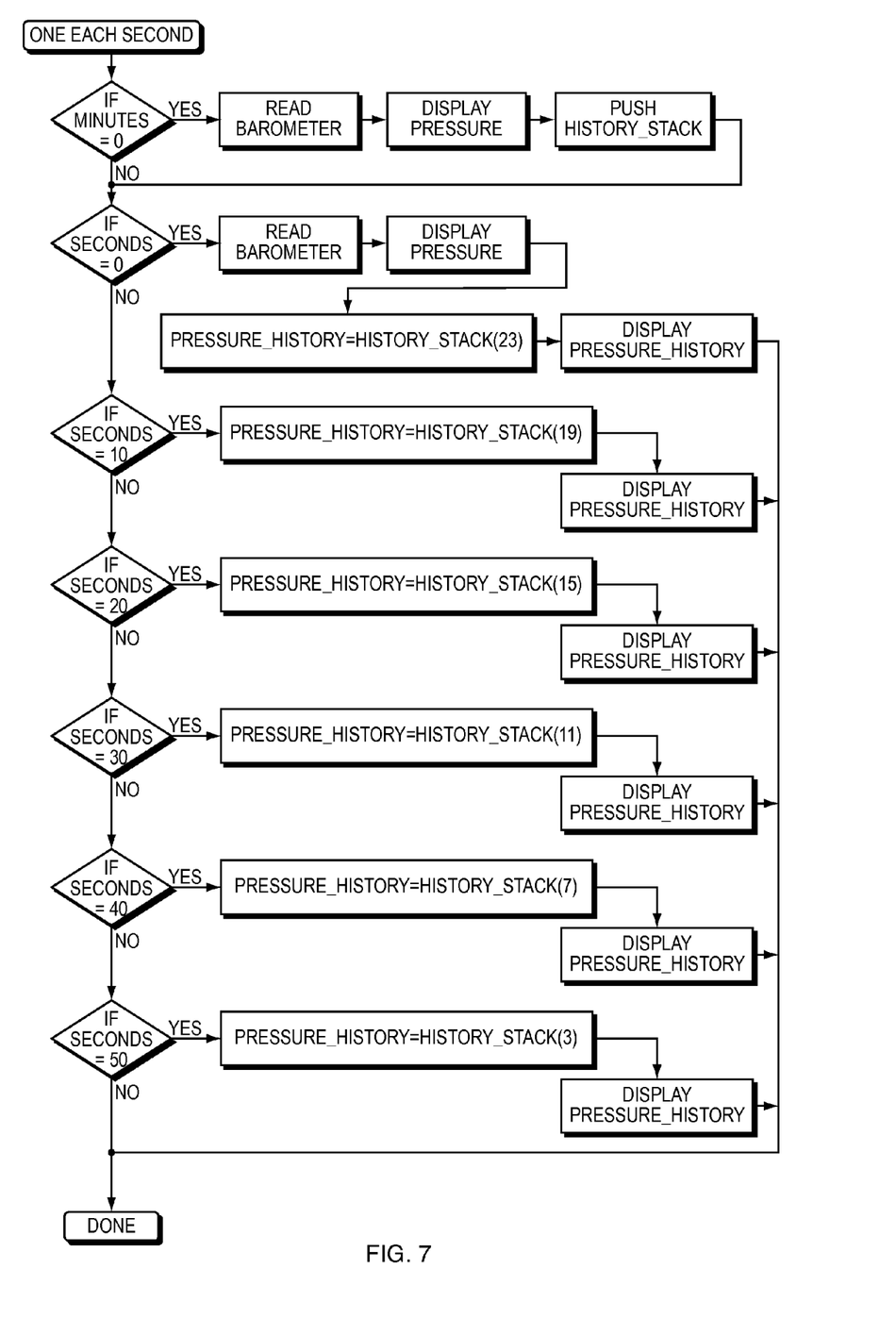
FIG. 7 shows an algorithm for the animation of the embodiments of FIG. 1 and FIG. 2 according to one embodiment of the present invention.

Referring to FIG. 7, a flowchart is shown of a method that may be performed by embodiments of the present invention to read, store, retrieve, and display barometric pressure over time. The method of FIG. 7 may, for example, be performed by any of the embodiments shown in FIGS. 1-6 to perform the functions disclosed in connection therewith. For purposes of example and ease of illustration, the embodiment shown in FIG. 7 uses six equal time intervals (segments) of ten seconds each. This, however, is merely an example and does not constitute a limitation of the present invention. More generally, the embodiment of FIG. 7, and the other embodiments disclosed herein, may use any number of time intervals, each consisting of any amount of time. Any two time intervals may consist of the same or different amount of time as each other.

As shown in FIG. 7, the method of FIG. 7 may be performed repeatedly (e.g., periodically), such as once each second or other period. The method may obtain the value of the current minutes and current seconds of the current time, e.g., from the timekeeper to which an embodiment is connected, or from some other clock (such as a system clock of a computing device). For example, the method may identify the minutes value of the current time by reading the minutes component of the current time output by the timekeeper to which the embodiment of the present invention is connected (e.g., the minutes value represented by the minutes hand of the timekeeper). Similarly, the method may identify the seconds value of the current time by reading the seconds component of the current time output by the timekeeper to which the embodiment of the present invention is connected (e.g., the seconds value represented by the seconds hand of the timekeeper).

The method may determine whether the value of the current minutes is equal to zero. If the value of the current minutes is equal to zero, then the method may: (1) read the current barometric pressure value from the attached barometric instrument; (2) display the current barometric pressure value; and (3) push the current barometric pressure value onto a barometric pressure history stack, or otherwise store the current barometric pressure value in a memory. The method may, for example, store both the current barometric pressure value and the current time in association with the current barometric pressure value, so that both the current barometric pressure value and the time at which that barometric pressure value was read may be retrieved with each other, or so that a particular time T may be used to retrieve the barometric pressure value that was read at time T. As the method repeats the steps described in this paragraph at a plurality of times (e.g., over the course of an hour, a day, or any other time period), the method accumulates stored readings of barometric pressures at the plurality of times in the memory. For example, by repeating the steps described in this paragraph over the course of a day, the method accumulates a plurality of (e.g., 12) stored readings of barometric pressures (e.g., one for each hour of the day). Although in the embodiment illustrated in FIG. 7, barometric pressure readings are read and stored once each hour, at the beginning of each hour, this is merely an example and does not constitute a limitation of the present invention. Alternatively, for example, embodiments of the present invention may read and store barometric pressure readings once each second, ten seconds, thirty seconds, minute, five minutes, ten minutes, thirty minutes, two hours, four hours, eight hours, or day. More generally, embodiments of the present invention may read and store barometric pressure readings at any times, whether periodically, non-periodically (e.g., in response to user input), or a combination thereof.

Furthermore, in the embodiment illustrated in FIG. 7, the memory (e.g., stack) in which barometric pressure readings are stored may have a finite number of addresses (e.g., 12). When all such addresses have been filled, storing (e.g., pushing) the next barometric pressure reading into the memory may cause the oldest stored barometric pressure reading to be removed from the memory. This is merely an example, however, and does not constitute a limitation of the present invention. More generally, any kind of memory system may be used to store barometric pressure readings, including memory systems which do not have the limitations of those illustrated by the method of FIG. 7.

In the method of FIG. 7, each of a plurality of time intervals is associated with a corresponding previous time lookup index. More specifically, in the example of FIG. 7:

seconds 0-9 are associated with a previous time lookup index of −23 hours;

seconds 10-19 are associated with a previous time lookup index of −19 hours;

seconds 20-29 are associated with a previous time lookup index of −15 hours;

seconds 30-39 are associated with a previous time lookup index of −11 hours;

seconds 40-49 are associated with a previous time lookup index of −7 hours; and seconds 50-59 are associated with a previous time lookup index of −3 hours.

These particular associations of current time intervals (e.g., intervals of seconds) with previous time lookup indices is merely an example and does not constitute a limitation of the present invention. More generally, the method may use any associations between any time intervals (e.g., intervals of seconds, minutes, or hours) with any previous time lookup indices.

The method may determine whether the value of the current seconds is equal to zero. If the value of the current seconds is equal to zero, then the method may: (1) read the current barometric pressure value from the attached barometric instrument; (2) display the current barometric pressure value; (3) retrieve the stored barometric pressure associated with the time that is 23 hours earlier than the current time; and (4) display the retrieved barometric pressure.

The method may determine whether the value of the current seconds is equal to 10. If the value of the current seconds is equal to 10, then the method may: (1) retrieve the stored barometric pressure associated with the time that is 19 hours earlier than the current time; and (2) display the retrieved barometric pressure.

The method may determine whether the value of the current seconds is equal to 20. If the value of the current seconds is equal to 20, then the method may: (1) retrieve the stored barometric pressure associated with the time that is 15 hours earlier than the current time; and (2) display the retrieved barometric pressure.

The method may determine whether the value of the current seconds is equal to 30. If the value of the current seconds is equal to 30, then the method may: (1) retrieve the stored barometric pressure associated with the time that is 11 hours earlier than the current time; and (2) display the retrieved barometric pressure.

The method may determine whether the value of the current seconds is equal to 40. If the value of the current seconds is equal to 40, then the method may: (1) retrieve the stored barometric pressure associated with the time that is 7 hours earlier than the current time; and (2) display the retrieved barometric pressure.

The method may determine whether the value of the current seconds is equal to 50. If the value of the current seconds is equal to 50, then the method may: (1) retrieve the stored barometric pressure associated with the time that is 3 hours earlier than the current time; and (2) display the retrieved barometric pressure.

Figure 8:
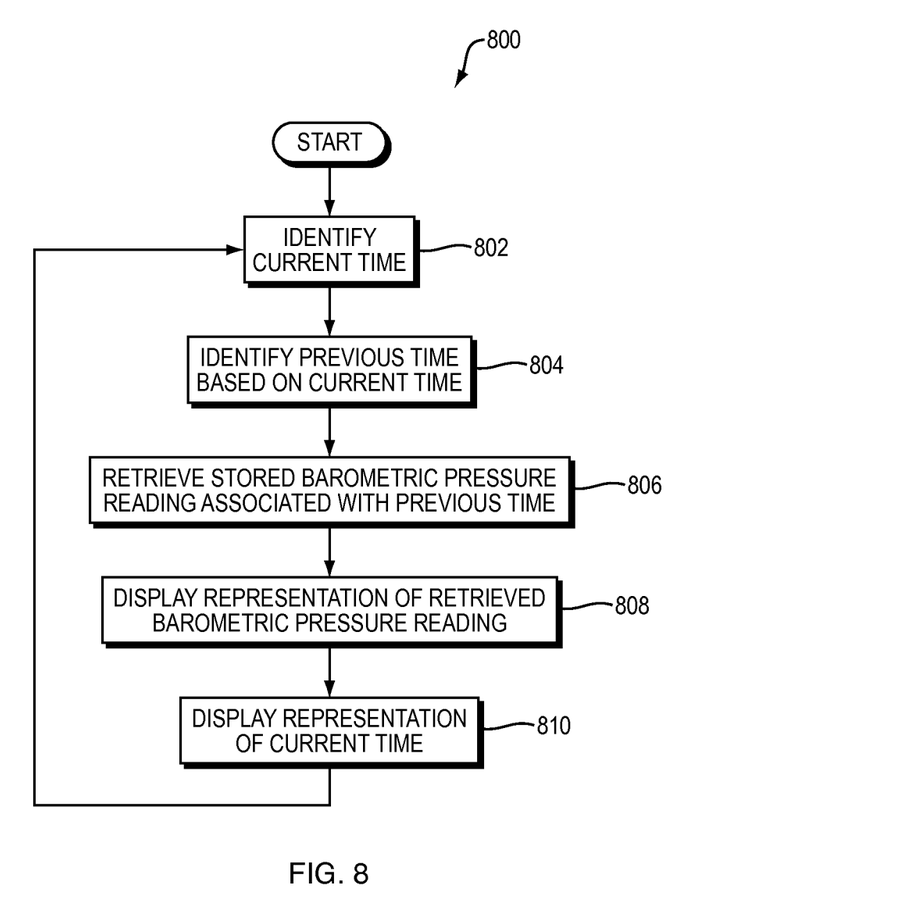
FIG. 8 shows a method for displaying a history of barometric pressure readings according to one embodiment of the present invention.

The method of FIG. 7 is an example of a more general method that may be implemented in any of a variety of ways according to embodiments of the present invention. Such a method 800 is illustrated in the flowchart of FIG. 8. According to this method, a current time is identified (FIG. 8, operation 802). Such a current time may, for example, be the seconds component of the current time output by a timekeeper.

Next, a previous time is identified based on the current time. Once the method 800 has identified the current time, the method 800 may identify the previous time lookup index associated with the current time, and identify (e.g., calculate) the previous time by, for example, subtracting the previous time lookup index from the current time (FIG. 8, operation 804). The method 800 may then retrieve, from the memory of stored barometric pressure readings, the stored barometric pressure reading associated with the calculated previous time (FIG. 8, operation 806). To perform such retrieval, the method 800 may, for example, use the previous time lookup index as an index into the memory of stored barometric pressure readings to read the stored barometric pressure reading that is stored at the previous time lookup index in the memory.

Once the method 800 has retrieved the stored barometric pressure reading from the memory, the method 800 may display a representation of the retrieved barometric pressure reading, in any of the ways disclosed herein (FIG. 8, operation 808). The method 800 may also display a representation of the current time (FIG. 8, operation 810).

The method 800 may repeat operations 802-810 above over time, i.e., as the current time changes. For example, the method 800 may perform operations 802-810 first at a first current time, then again at a second (later) current time, then again at a third (yet later) current time, and so on. As a result, the method 800 may retrieve and display successive stored barometric pressure readings, thereby producing the animated display of barometric pressure history disclosed herein.

Figure 9:
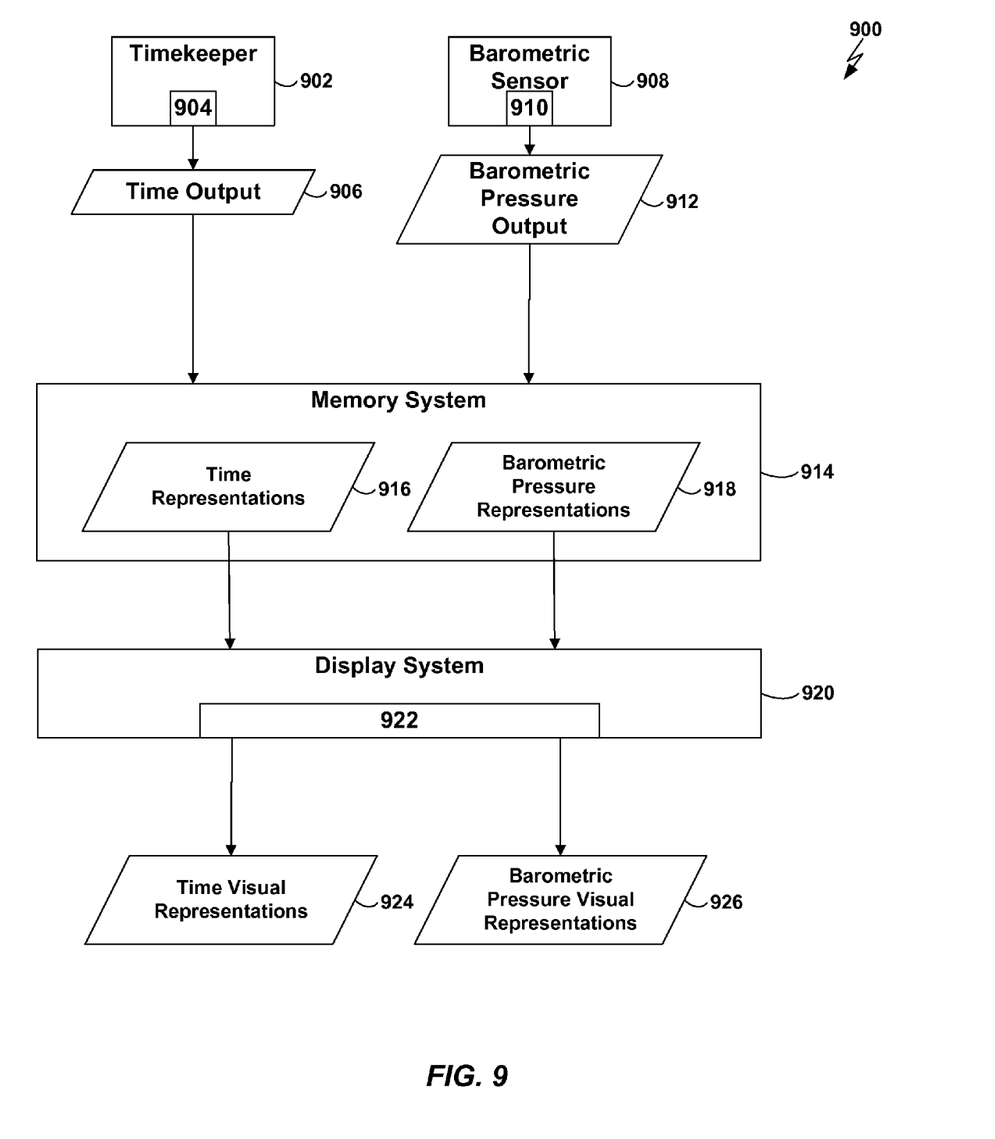
FIG. 9 shows a dataflow diagram of a system for implementing one embodiment of the present invention.

Referring to FIG. 9, a dataflow diagram is shown of a system 900 for implementing one embodiment of the present invention. The system 900 includes a timekeeper 902, which includes means 904 for producing output 906 representing a plurality of times. The system 900 also includes a barometric sensor 908, which includes means 910 for outputting a plurality of barometric pressure values 912, wherein each of the plurality of barometric pressure values is associated with a distinct one of the plurality of times. The system 900 also includes a memory system 914, which includes representations 916 of the plurality of times 906, and representations 918 of the plurality of barometric pressure values 912. The system 900 also includes a display system 920, which includes history output means 922 for outputting, based on the representations 916 of the plurality of times and the representations 918 of the plurality of barometric pressure values in the memory system 914, visual representations 924 of the plurality of times 906 and visual representations 926 of the plurality of barometric pressure values.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although certain embodiments of the present invention are disclosed herein as being constructed by adding or supplementing existing devices (e.g., timekeepers and/or barometric instruments) with additional components (such as components for displaying an animated history of barometric data), any embodiment disclosed herein may be implemented by constructing some or all of the embodiment from its source components, rather than by supplementing a previously-constructed device with additional components.

Any of the visual features of embodiments disclosed herein, such as any of the components shown in FIGS. 1-6, may be implemented using images displayed on a visual output device, such as a computer monitor or other display screen (e.g., a touch screen). As a result, any moving parts or other changes in the appearance of components of embodiments disclosed herein (such as movement of components 12, 16, 20, and 34) may be implemented by displaying animated or images or images which otherwise change over time to display the information disclosed herein, such as images which simulate the movement of mechanical parts.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster or vector output device capable of producing color or gray scale pixels or vectors on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A device comprising:
   a timekeeper comprising means for producing output representing a plurality of times;
   a barometric sensor comprising means for outputting a plurality of barometric pressure values, wherein each of the plurality of barometric pressure values is associated with a distinct one of the plurality of times;
   a memory system comprising representations of the plurality of times and representations of the plurality of barometric pressure values; and
   a display system comprising history output means for outputting, based on the representations of the plurality of times and the representations of the plurality of barometric pressure values in the memory system, an animated sequence of visual representations of the plurality of barometric pressure values and visual representations of the plurality of times associated with the plurality of barometric pressure values,
   the display system further comprising current output means for outputting visual representations of current barometric pressure values;
   wherein the visual representations of the plurality of barometric pressure values comprise visual representations displayed at a first plurality of angles to a first line; and
   wherein the visual representations of the current barometric pressure values comprise visual representations displayed at a second plurality of angles to a second line; and
   wherein the visual representations of the plurality of times associated with the plurality of barometric pressure values visual representations displayed at a third plurality of angles to a third line.

2. The device of claim 1, wherein the history output means comprises means for outputting, for each of the plurality of barometric pressure values in the memory system, a visual representation of that barometric pressure value and an indication of the time associated with that barometric pressure value.

3. The device of claim 1, further comprising:
   means for storing, in the memory system, a representation of the current barometric pressure value and the current time.

4. The device of claim 1, wherein the display system further comprises current barometric pressure scale means for outputting a visual representation of a scale of the current barometric pressure value.

5. The device of claim 1, further comprising:
an additional display system comprising additional history output means for outputting, based on the representations of the plurality of times and the representations of the plurality of barometric pressure values in the memory system, additional visual representations of the plurality of barometric pressure values and the plurality of times associated with the plurality of barometric pressure values.

6. The device of claim 1, wherein the history output means comprises:
means for outputting, at a first time, a first visual representation of a first one of the plurality of barometric pressure values and a first time, in the plurality of times, that is associated with the first one of the plurality of barometric pressure values; and
means for outputting, at a second time that is later than the first time, a second visual representation of a second one of the plurality of barometric pressure values and a second time, in the plurality of times, that is associated with the second one of the plurality of barometric pressure values.

7. The device of claim 1, wherein the display system comprises a mechanical part, and wherein the history output means comprises means for outputting the visual representations using the mechanical part.

8. The device of claim 1, wherein the visual representations comprise visual representations of a mechanical part.

9. The device of claim 1:
wherein the history output means comprises means for synchronizing the output of the visual representations to the plurality of times output by the timekeeper.

10. The device of claim 1, wherein the visual representations represent absolute values of the plurality of barometric pressure values.

11. The device of claim 1, wherein the visual representations represent values of the plurality of barometric pressure values that are relative to a current barometric pressure value.

12. The device of claim 1, wherein the display system further comprises barometric pressure history scale means for outputting a visual representation of a scale of the plurality of barometric pressure values.

13. The device of claim 1, wherein the display system further comprises barometric pressure history offset means for outputting a visual representation of a current pressure history offset.

14. The device of claim 1, wherein the means for producing the output representing the plurality of times comprises means for producing output representing a current pressure history offset.

15. The device of claim 1, further comprising:
an altimeter comprising:
means for measuring a current altitude of the device; and
means for modifying at least one of the plurality of barometric pressure values based on the current altitude of the device.

16. A method performed by at least one computer processor executing computer program instructions stored on at least one non-transitory computer-readable medium, the method comprising:
(a) identifying a first current time;
(b) identifying a first previous time based on the first current time;
(c) retrieving, from a memory, a first stored barometric pressure reading associated with the first previous time;
(d) displaying a representation of the first stored barometric pressure reading at a first angle to a first line; and
(e) displaying a representation of the first previous time at a second angle to a second line.

17. The method of claim 16, further comprising:
(f) displaying a representation of the first current time.

18. The method of claim 16, further comprising:
(f) identifying a second current time, wherein the second current time is later than the first current time;
(g) identifying a second previous time based on the second previous time, wherein the second previous time differs from the first previous time;
(h) retrieving, from the memory, a second stored barometric pressure reading associated with the second previous time;
(i) displaying a representation of the second stored barometric pressure reading at a third angle to the first line; and
(j) displaying a representation of the second previous time at a fourth angle to the second line.

19. The method of claim 18, further comprising:
(k) displaying a representation of the second current time.

20. The method of claim 16, wherein (a) comprises identifying the first current time by reading the first current time from a timekeeper.

21. The method of claim 20, wherein (a) comprises identifying a seconds component of a current time output by the timekeeper.

22. A non-transitory computer-readable medium comprising computer program instructions executable by a computer processor to execute a method, the method comprising:
(a) identifying a first current time;
(b) identifying a first previous time based on the first current time;
(c) retrieving, from a memory, a first stored barometric pressure reading associated with the first previous time;
(d) displaying a representation of the first stored barometric pressure reading.

23. The non-transitory computer-readable medium of claim 22, wherein the method further comprises:
(f) displaying a representation of the first current time.

24. The non-transitory computer-readable medium of claim 22, wherein the method further comprises:
(f) identifying a second current time, wherein the second current time is later than the first current time;
(g) identifying a second previous time based on the second previous time, wherein the second previous time differs from the first previous time;
(h) retrieving, from the memory, a second stored barometric pressure reading associated with the second previous time;
(i) displaying a representation of the second stored barometric pressure reading at a third angle to the first line; and
(j) displaying a representation of the second previous time at a fourth angle to the second line.

25. The non-transitory computer-readable medium of claim 24, wherein the method further comprises:
(j) displaying a representation of the second current time.

26. The non-transitory computer-readable medium of claim 22, wherein (a) comprises identifying the first current time by reading the first current time from a timekeeper.

27. The non-transitory computer-readable medium of claim 26, wherein (a) comprises identifying a seconds component of a current time output by the timekeeper.

* * * * *